(12) United States Patent
Jeon et al.

(10) Patent No.: US 7,372,528 B2
(45) Date of Patent: May 13, 2008

(54) ARRAY SUBSTRATE, METHOD OF MANUFACTURING THE SAME AND LIQUID CRYSTAL DISPLAY APPARATUS HAVING THE SAME

(75) Inventors: Jin Jeon, Seoul (KR); Jin-Suk Park, Seoul (KR); Dong-Hwan Kim, Suwon-si (KR); Kyo-Seop Choo, Suwon-si (KR); Yong-Ho Yang, Seoul (KR); Ji-Hye Moon, Seoul (KR); Won-Kyu Lee, Seongnam-si (KR); Jun-Ho Song, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/854,850

(22) Filed: May 27, 2004

(65) Prior Publication Data

US 2004/0246409 A1    Dec. 9, 2004

(30) Foreign Application Priority Data

Jun. 9, 2003   (KR) ...................... 10-2003-0036810
Sep. 25, 2003  (KR) ...................... 10-2003-0066541

(51) Int. Cl.
   *G02F 1/1333*   (2006.01)
(52) U.S. Cl. ........................................ 349/110; 349/38
(58) Field of Classification Search ................ 349/111, 349/110, 38
   See application file for complete search history.

(56) References Cited

U.S. PATENT DOCUMENTS 5,781,254 A * 7/1998 Kim et al. .................... 349/44
5,926,702 A * 7/1999 Kwon et al. ................. 438/158
5,956,103 A * 9/1999 Ishiguro ...................... 349/38
6,023,309 A * 2/2000 Gogna et al. ................. 349/42
6,525,788 B1   2/2003 Nakagawa et al.
2001/0046003 A1  11/2001 Song
2004/0135939 A1 * 7/2004 Luo ........................... 349/110

OTHER PUBLICATIONS

Chinese Office Action and English translation thereof for Application. No. 2004100493931 dated Jul. 27, 2007.

* cited by examiner

*Primary Examiner*—David Nelms
*Assistant Examiner*—Richard H Kim
(74) *Attorney, Agent, or Firm*—Cantor Colburn LLP (57)   ABSTRACT

An array substrate includes a transparent substrate, pixel electrodes, switching devices, a data line, a gate line and a light blocking pattern. The light blocking pattern corresponding to a storage electrode is disposed on the transparent substrate, and the light blocking pattern blocks a light leaked from a space between the pixel electrodes. The pixel electrodes are spaced apart from the light blocking pattern by a first distance. The data line is spaced apart from the light blocking pattern by a second distance, and the data line is disposed under a region between the pixel electrodes. The data line is electrically connected to the source electrode, and the data line has a first width. The gate line is electrically connected to the gate electrode to turn on/off the switching devices. Therefore, a black matrix is not required, thereby enhancing an aperture ratio.

12 Claims, 10 Drawing Sheets

ARRAY SUBSTRATE, METHOD OF MANUFACTURING THE SAME AND LIQUID CRYSTAL DISPLAY APPARATUS HAVING THE SAME

CROSS-REFERENCE TO RELATED APPLICATIONS

This application relies for priorities upon Korean Patent Application No. 2003-36810 filed on Jun. 9, 2003 and Korean Patent Application No. 2003-66541 filed on Sep. 25, 2003, the contents of which are herein incorporated by reference in their entireties.

BACKGROUND OF THE INVENTION

1. Field of the Invention

The present invention relates to an array substrate, a method of manufacturing the array substrate and a liquid crystal display apparatus having the array substrate. More particularly, the present invention relates to an array substrate having enhanced opening ratio, a method of manufacturing the array substrate and a liquid crystal display apparatus having the array substrate.

2. Description of the Related Art

A liquid crystal display apparatus displays images by using liquid crystal. The liquid crystal display apparatus possesses many merits such as thin thickness, lightweight, etc. Therefore, the liquid crystal display apparatus has been widely used.

The liquid crystal display apparatus includes a liquid crystal display panel and a backlight assembly. The backlight assembly is disposed under the liquid crystal display panel to provide the liquid crystal display panel with a light.

The liquid crystal display panel includes a color filter substrate, an array substrate and a liquid crystal layer interposed between the color filter substrate and the array substrate. The color filter substrate includes color filters including a red color filter, a green color filter and a blue color filter. The color filters are arranged in a matrix shape. The color filters filter a light that passes through a pixel electrode to transmit the light having a specific wavelength. Hereinafter, a conventional array substrate will be explained.

Figure 1:
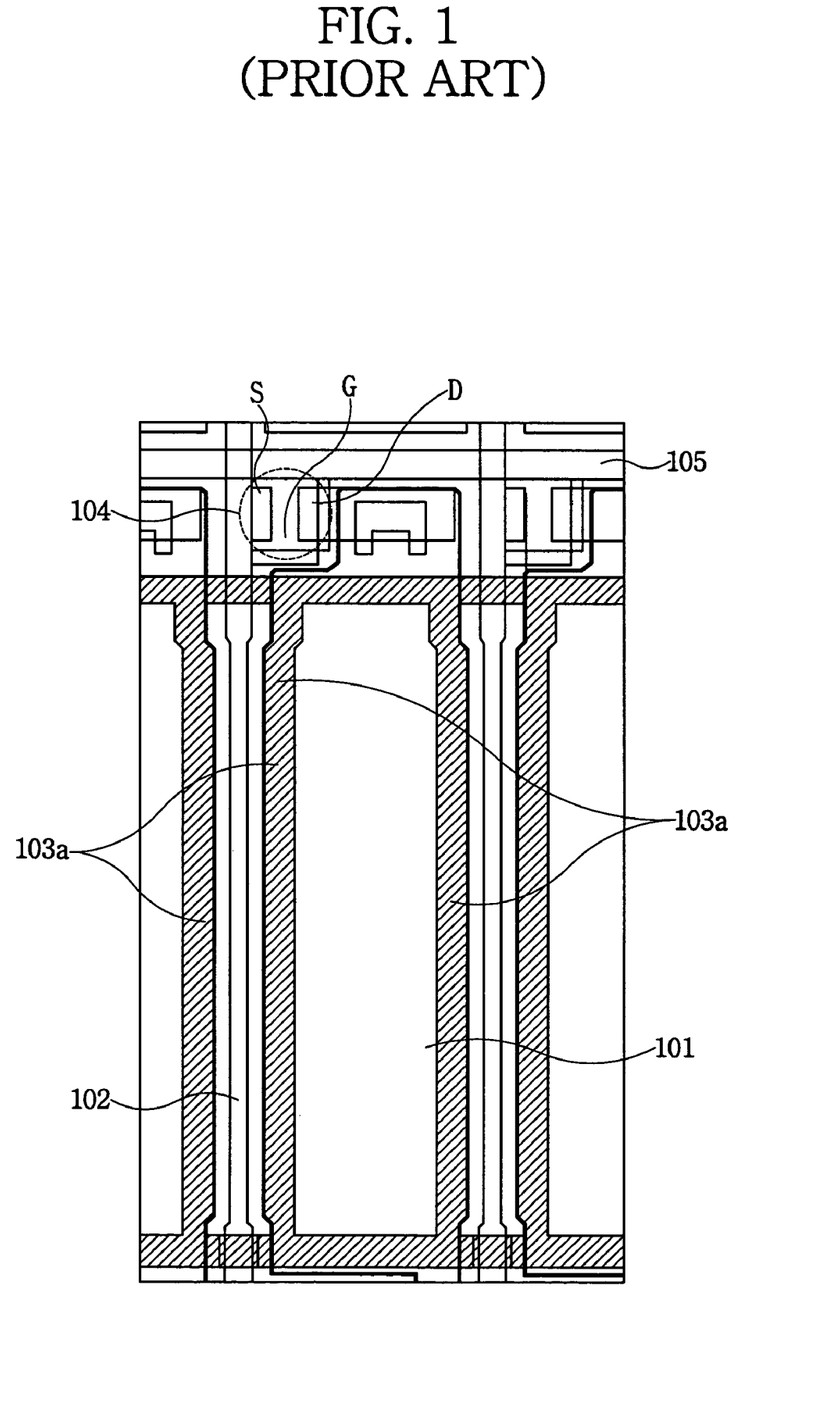
FIG. 1 is a layout illustrating a conventional liquid crystal display apparatus.
Figure 2:
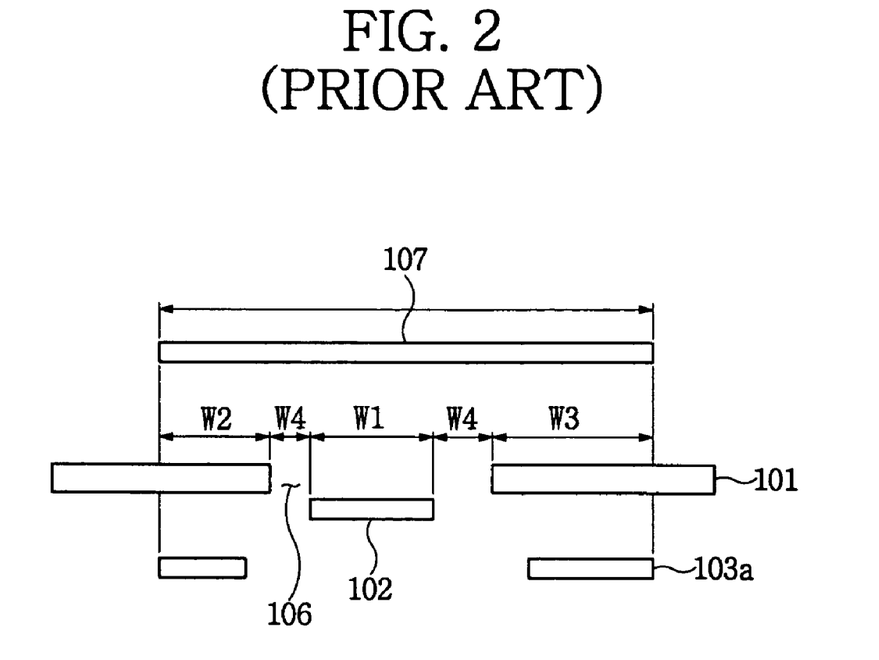
FIG. 2 is a schematic cross-sectional view of the liquid crystal display apparatus in FIG. 1.

FIG. 1 is a layout illustrating a conventional liquid crystal display apparatus, and FIG. 2 is a schematic cross-sectional view of the liquid crystal display apparatus in FIG. 1.

A conventional array substrate includes a thin film transistor 104, a storage electrode 103a and a pixel electrode 101. The thin film transistor 104, the storage electrode 103a and the pixel electrode 101 are opposite to a color filter (not shown) of a color filter substrate (not shown).

The array substrate further includes a data line 102 and a gate line 105. The is data line 102 and the gate line 105 are disposed between the color filters, and the data line 102 and the gate line 105 are extended along a region between the color filters.

The data line 102 is electrically connected to a source electrode S of the thin film transistor 104, and the gate line 105 is electrically connected to a gate electrode G of the thin film transistor 104. A drain electrode D of the thin film transistor 104 is electrically connected to the pixel electrode 101.

When a gate voltage is applied to the gate line 105, the thin film transistor 104 that is electrically connected to the gate line 105 is turned on, and a data voltage of the data line 102 is applied to the pixel electrode 101 through the thin film transistor 104. When the data voltage is applied to the pixel electrode 101, electric fields are generated between the pixel electrode 101 and a common electrode (not shown) of the color filter substrate. Therefore, an arrangement of liquid crystal molecules of a liquid crystal layer (not shown) disposed between the color filter substrate and the array substrate is changed to adjust optical transmittance to display images.

The storage electrode 103a supports a liquid crystal capacitor formed by the pixel electrode 101, the liquid crystal layer and the common electrode to maintain the data voltage. When the data voltage is applied to the pixel electrode 101, the storage electrode 103a prevents variation of the data voltage. The storage electrode 103a may be formed at edge portion of the pixel electrode 101.

According to the conventional array substrate described above, a light is leaked through an opening 106 between the data line 102 and the storage electrode 103a. Therefore, a light blocking layer 107 (or black matrix) formed at the color filter substrate or the array substrate is employed in order to prevent the light from being leaked through the opening 106.

The light blocking layer 107 blocks the opening 106. That is, in the conventional liquid crystal display apparatus, the light blocking layer is contained in the color filter substrate.

For example, the light blocking layer 107 has a left margin W4 of about 5 μm and a right margin W3 of about 6 μm, and a width W4 of right and left opening 106 is about 2.5 μm. As a result, a width of the light blocking layer 107 is about 22 μm. Therefore, an aperture ratio of the conventional array substrate is lowered due to the light blocking layer having wide width.

A light that passes through the opening 107 is diffracted to form a diffracted light. Therefore, when a distance between the light blocking layer 107 and the opening 106 increases, the width of the light blocking layer 107 increases in order to block the light. Therefore, reducing the distance between the light blocking layer 107 and the opening 106 is desirable in order to enhance the aperture ratio. However, reducing the distance between the light blocking layer 107 and the opening 106 is limited due to the liquid crystal layer. Therefore, enhancing the aperture ratio is also limited.

Furthermore, the light blocking layer 107 is formed on the color filter substrate, and a liquid crystal display apparatus is formed by assembling the color filter substrate and the array substrate. Therefore, even a minute misalignment may induce the light leakage. When a width of margin of the light blocking layer is increased in order to compensate the misalignment, the aperture ratio is also lowered.

SUMMARY OF THE INVENTION

The present invention provides an array substrate having enhanced opening ratio.

The present invention also provides a method of manufacturing the array substrate.

The present invention also provides a liquid crystal display apparatus having the array substrate.

In an exemplary array substrate according to the present invention, the array substrate includes a transparent substrate, a plurality of pixel electrodes, a plurality of switching devices, a data line, a gate line and a light blocking pattern. The light blocking pattern is disposed on the transparent substrate, and the light blocking pattern blocks a light leaked from a space between the pixel electrodes. The pixel electrodes are arranged in a matrix shape, and the pixel electrodes are spaced apart from the light blocking pattern by a first distance. The switching devices include gate, drain and source electrodes. The drain electrodes of the switching devices are electrically connected to the pixel electrodes, respectively. The data line is spaced apart from the light blocking pattern by a second distance, and the data line is disposed under a region between the pixel electrodes. The data line is electrically connected to the source electrode, and the data line has a first width. The gate line is electrically connected to the gate electrode to turn on/off the switching devices. In an exemplary method of manufacturing the array substrate according to the present invention, a gate line is formed over a transparent substrate, and a light blocking pattern is formed over the transparent substrate. A data line having a first width is also formed over the transparent substrate, and a switching device including a gate electrode that is electrically connected to the gate line, a drain electrode and a source electrode that is electrically connected to the data line is formed. Then, a pixel electrode that is electrically connected to the drain electrode is formed.

In an exemplary liquid crystal display apparatus, the liquid crystal display apparatus includes a color filter substrate, an array substrate and a liquid crystal layer. The color filter substrate includes color filters. The array substrate includes a transparent substrate, a plurality of pixel electrodes, a plurality of switching devices, a data line, a gate line and a light blocking pattern. The light blocking pattern is disposed on the transparent substrate, and the light blocking pattern blocks a light leaked from a space between the pixel electrodes. The pixel electrodes are arranged in a matrix shape, and the pixel electrodes are spaced apart from the light blocking pattern by a first distance. The switching devices include gate, drain and source electrodes. The drain electrodes of the switching devices are electrically connected to the pixel electrodes, respectively. The data line is spaced apart from the light blocking pattern by a second distance, and the data line is disposed under a region between the pixel electrodes. The data line is electrically connected to the source electrode, and the data line has a first width. The gate line is electrically connected to the gate electrode to turn on/off the switching devices. The liquid crystal layer is interposed between the color filter substrate and the array substrate.

According to the present invention, the storage electrode or the floating gate prevents a light leakage. A distance between the openings and the storage electrode or the floating gate that blocks the light passing through the openings is relatively short, so that a marginal width of the pixel electrode and storage electrode or a marginal width of the pixel electrode and the floating gate may be reduced.

Furthermore, the storage electrode or the floating gate is formed on a substrate on which the pixel electrode is formed. Therefore, a margin for misalignment between the color filter substrate and the array substrate is not required to enhance an aperture ratio.

BRIEF DESCRIPTION OF THE DRAWINGS

The above and other features and advantage points of the present invention will become more apparent by describing in detailed exemplary embodiments thereof with reference to the accompanying drawings, in which.

DESCRIPTION OF PREFERRED EMBODIMENTS

Hereinafter, an explanation for a storage electrode may be applied to an explanation for a floating gate and vice versa. Furthermore, the explanations of the storage electrode and the floating gate may be applied to any element disposed below a data line or a gate line.

Hereinafter, the preferred embodiments of the present invention will be described in detail with reference to the accompanied drawings.

Figure 3:
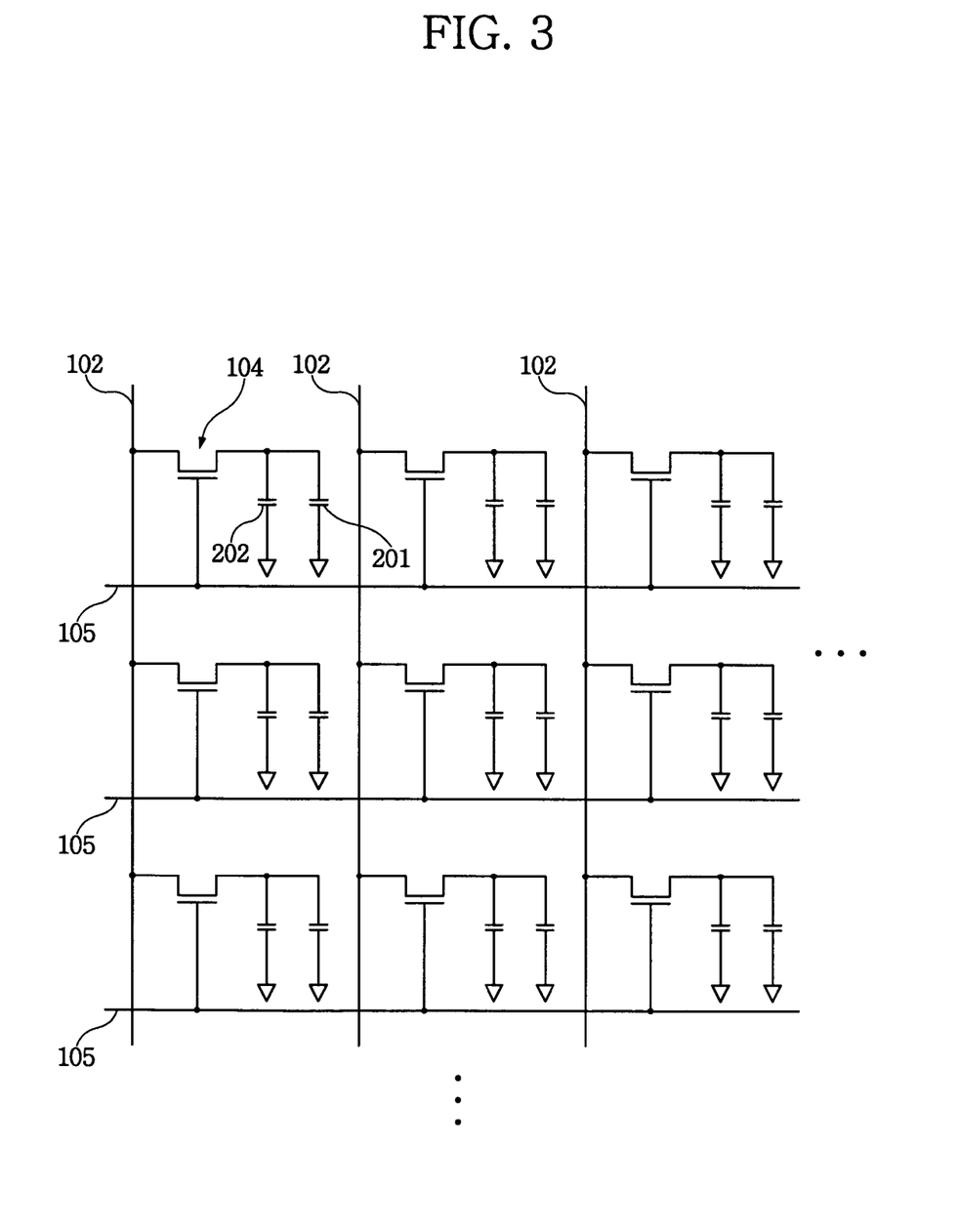
FIG. 3 is a schematic circuit diagram illustrating an array substrate.

FIG. 3 is a schematic circuit diagram illustrating an array substrate.

Referring to FIG. 3, an array substrate includes a plurality of data lines 102 and a plurality of gate lines 105. The data lines 102 are extended in a first direction, and the gate lines 105 are extended in a second direction that is substantially perpendicular to the first direction.

The data lines 102 are formed on a different layer from the gate lines 105. The data lines 102 and the gate lines 105 define a pixel. The pixel includes a thin film transistor 104, a storage capacitor 202 and a liquid crystal capacitor 201 defined by a pixel electrode, a liquid crystal layer and a common electrode.

The thin film transistor 104 includes a gate electrode G that is electrically connected to the gate line 105, a source electrode S that is electrically connected to the data line 102, and a drain electrode D that is electrically connected to the storage capacitor 202 and the liquid crystal capacitor 201.

When a gate voltage is applied to the gate electrode G, the thin film transistor 104 is turned on. When the thin film transistor 104 is turned on, a pixel voltage (or data voltage) of the data line 102 is applied to the liquid crystal capacitor 201 and the storage capacitor 202 through the thin film transistor 104. When the pixel voltage is applied to the liquid crystal capacitor 201, an arrangement of a liquid crystal layer interposed between the common electrode and the pixel electrode is changed to adjust optical transmittance to display images.

The storage capacitor 202 supports the liquid crystal capacitor 201 to maintain the pixel voltage.

The pixel electrode of the liquid crystal capacitor 201 includes an electrically conductive and optical transparent material such as indium tin oxide (ITO), indium zinc oxide (IZO), etc.

Hereinafter, an array substrate according to the present invention will be explained in detail.

Embodiment 1

Figure 4:
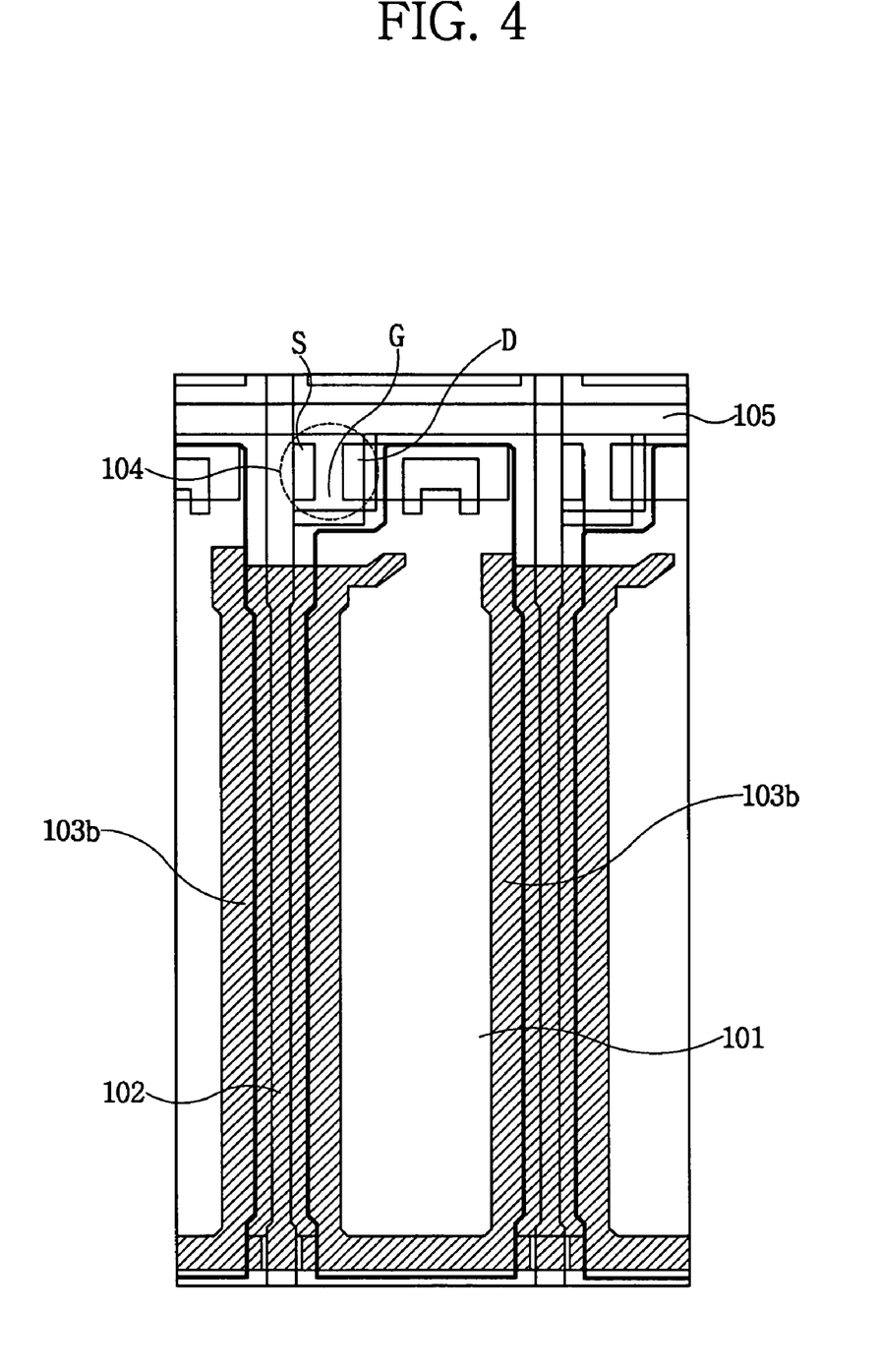
FIG. 4 is a layout illustrating an array substrate according to a first exemplary embodiment of the present invention.
Figure 5:
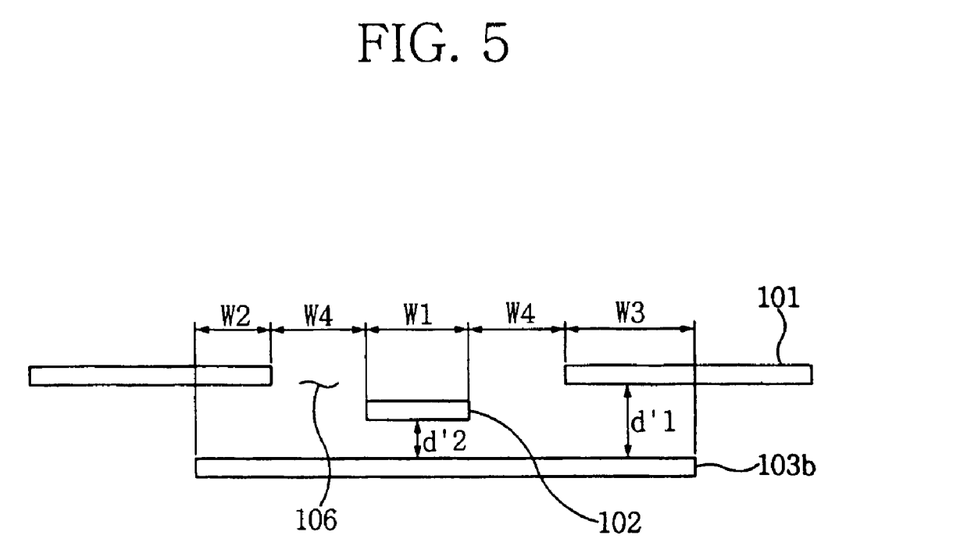
FIG. 5 is a schematic cross-sectional view illustrating the array substrate in FIG. 4.

FIG. 4 is a layout illustrating an array substrate according to a first exemplary embodiment of the present invention, and FIG. 5 is a schematic cross-sectional view illustrating the array substrate in FIG. 4.

Referring to FIGS. 4 and 5, an array substrate according to the present embodiment includes a transparent substrate, pixel electrode 101, a switching device 104, a data line 102, a gate line 105 and a storage electrode 103b.

The pixel electrode 101 is spaced apart from the light blocking pattern by a first distance d'1. A plurality of the pixel electrodes 101 is arranged in a matrix shape. The pixel electrode 101 includes an electrically conductive and optically transparent material such as indium tin oxide (ITO), indium zinc oxide (IZO), etc.

The switching device 104 includes a gate electrode G, a drain electrode D and a source electrode S. The drain electrode D is electrically connected to the pixel electrode 101. The data line 102 is spaced apart from the light blocking pattern by a second distance d'2, and the data line 102 is disposed between the pixel electrodes 101.

The data line 102 is electrically connected to the source electrode S, and the data line 102 has a first width W1. The data line 102 applies the pixel voltage to the pixel electrode 101. For example, the first width W1 is in a range from about 3.0 μm to about 4.0 μm. Preferably, the first width W1 is about 3.5 μm. According to the present embodiment, the data line 102 overlaps with the storage electrode 103b to induce a parasitic capacitance. Therefore, when the first width W1 of the data line decreases, the parasitic capacitance is also decreased. However, when the first width W1 is less than 3.0 μm, the data line 102 is electrically opened with ease.

The gate electrode G protrudes from the gate line 105, so that the gate electrode G is electrically connected to the gate line 105. An electric signal for turning on the thin film transistor 104 is applied to the gate electrode G of the thin film transistor 104 through the gate line 105.

The storage electrode 103b is spaced apart from the transparent substrate 108 by a third distance d3, and the storage electrode 103b is disposed between the pixel electrodes 101. The storage electrode 103b overlaps with a first pixel electrode by a second width W2, and the storage electrode 103b also overlaps with a second pixel electrode that is adjacent to the first pixel electrode by a third width W3.

For example, the second width W2 is in a range from about 2.5 μm to about 3.5 μm. Preferably, the second width W2 is about 3 μm. The third width W3 is in a range from about 4.5 μm to about 5.5 μm. Preferably, the third width W3 is about 5 μm.

As shown above, the second and third widths W2 and W3 formed are different from each other because liquid crystal molecules are arranged asymmetrically due to pretilt angle of the liquid crystal of the pixel electrode 101.

The storage electrode 103b is formed on a substrate on which the data line 102 and the pixel electrode 101 are formed. Therefore, when the opening 106 is blocked by the storage electrode 103b, a width of margin may be reduced regardless of misalignment between the color filter substrate and the array substrate.

Furthermore, a distance between the storage electrode 103b and the opening 106 is smaller than a distance between the conventional light blocking layer 107 and the opening 106 in FIG. 2, so that the width margin of the storage electrode 103b may be further reduced. Therefore, the aperture ratio is enhanced.

Embodiment 2

Figure 6:
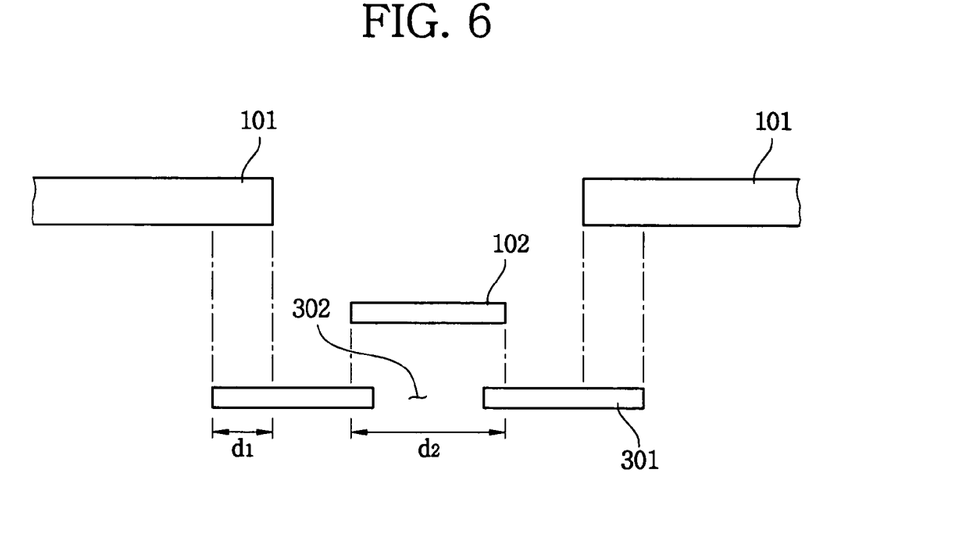
FIG. 6 is a schematic cross-sectional view illustrating an array substrate according to a second exemplary embodiment of the present invention.

FIG. 6 is a schematic cross-sectional view illustrating an array substrate according to a second exemplary embodiment of the present invention.

Referring to FIG. 6, an array substrate according to the present embodiment includes a pixel electrode 101, a data line 102 and a floating gate 301.

The data line 102 is disposed over the floating gate 301.

The floating gate 301 includes an opening 302. A width of the opening 302 is smaller than a width d2 of the data line 102. When the width of the opening 302 is larger than the width d2 of the data line 102, a light generated from a backlight assembly (not shown) may pass through a space between the opening 302 and the data line 102 to lower a contrast ratio and induce a deterioration of display quality.

The opening 302 may be extended along a longitudinal direction of the data line 102, or a plurality of openings 302 may be formed along the longitudinal direction of the data line 102.

Figure 7:
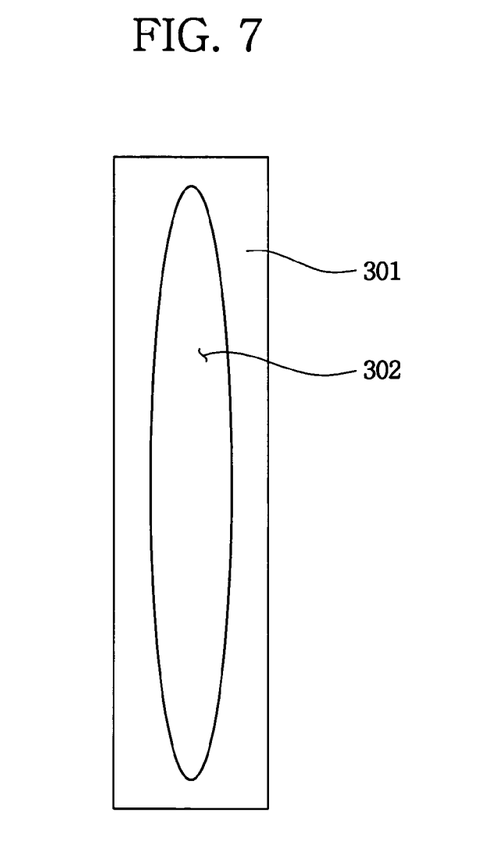
FIG. 7 is an exemplary embodiment of an opening formed at a floating gate in FIG. 6.
Figure 8:
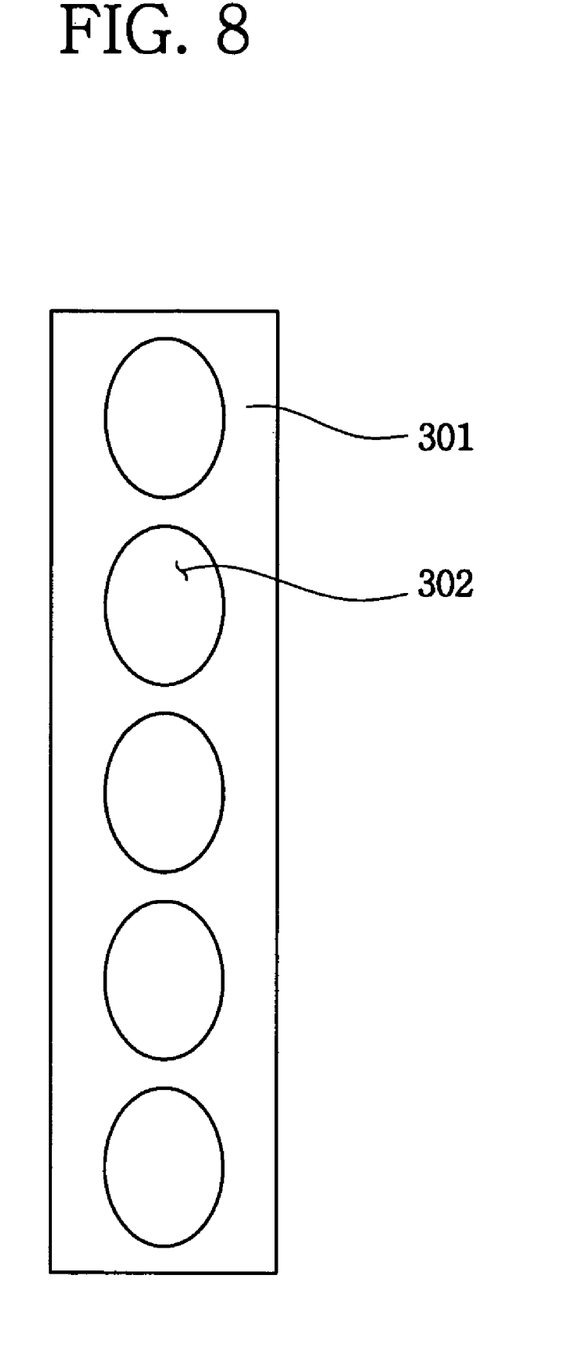
FIG. 8 is another exemplary embodiment of an opening formed at a floating gate in FIG. 6.

FIG. 7 is an exemplary embodiment of an opening formed at a floating gate in FIG. 6, and FIG. 8 is another exemplary embodiment of an opening formed at a floating gate in FIG. 6.

Referring to FIGS. 7 and 8, an opening 302 is extended along a longitudinal direction of the data line 102 or a plurality of openings 302 may be formed along the longitudinal direction of the data line 102. As long as the opening 302 reduces an overlapping area between the floating gate 301 and the data line 102, the opening 302 may be formed to have any various shapes.

As described above, when the opening 302 is formed at the floating gate 301, the overlapping area between the floating gate 301 and the data line 102 is reduced to lower a parasitic capacitance between the floating gate 301 and the data line 102. Therefore, power consumption is lowered.

Embodiment of Liquid Crystal Display Apparatus

Figure 9:
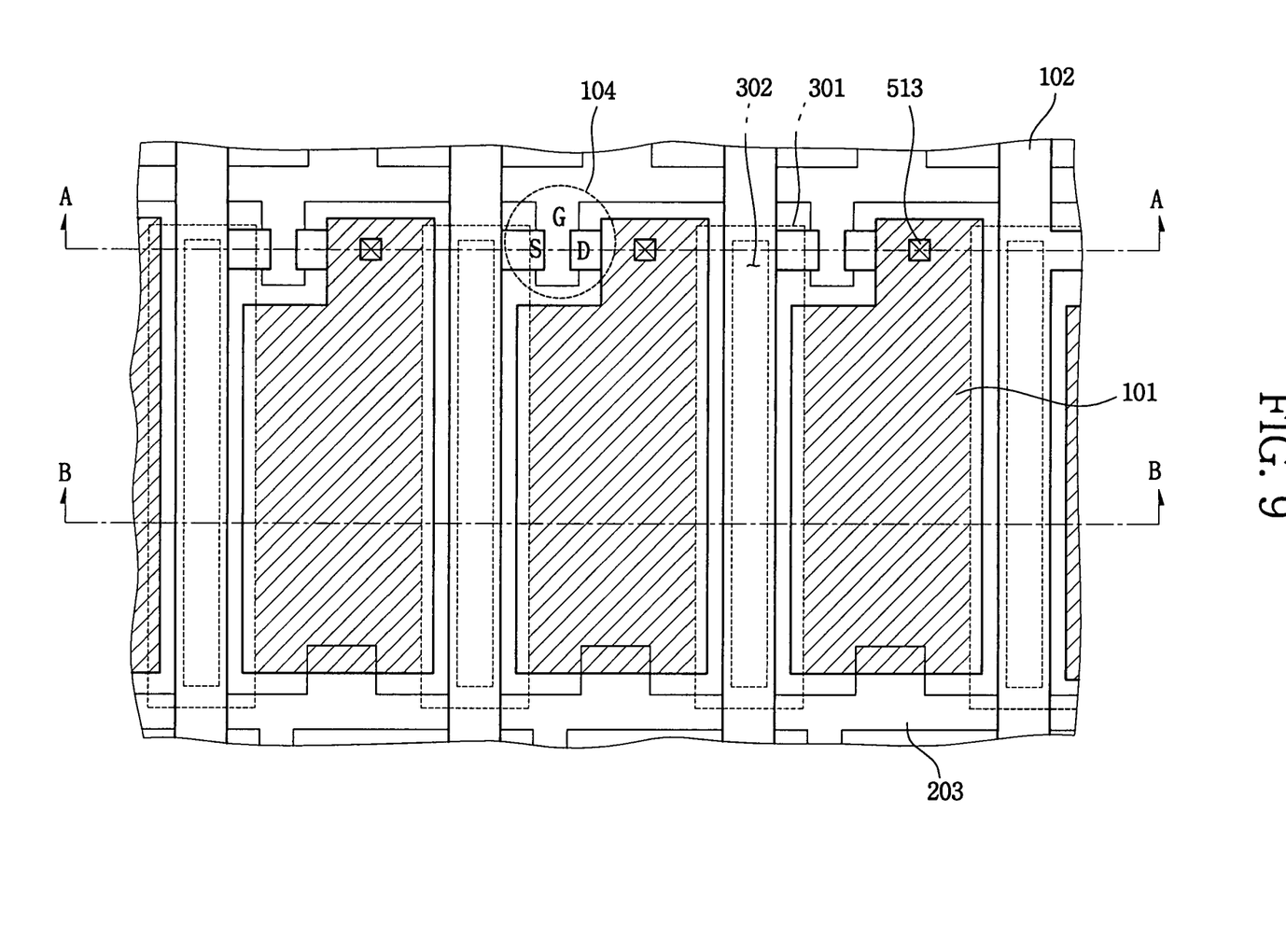
FIG. 9 is a layout illustrating an array substrate of a liquid crystal display apparatus according to an exemplary embodiment of the present invention.

FIG. 9 is a layout illustrating an array substrate of a liquid crystal display apparatus according to an exemplary embodiment of the present invention.

Referring to FIG. 9, an array substrate of a liquid crystal display apparatus according to the present embodiment includes a plurality of pixel electrodes 101 and a floating gate 301 disposed between the pixel electrodes 101. The floating gate 301 includes an opening 302. For example, the opening 302 is extended in a longitudinal direction of the floating gate 301. Alternatively, a plurality of openings 302 may be arranged along the longitudinal direction of the floating gate 301.

A data line 102 is disposed over the floating gate 301, and a portion of the data line 102 protrudes from the data line 102 to form a source electrode S of a thin film transistor 104. A portion of the gate line 203 protrudes from a gate line 203 to form a gate electrode G of the thin film transistor 104. A drain electrode D of the thin film transistor 104 is electrically connected to the pixel electrode 101.

Figure 10:
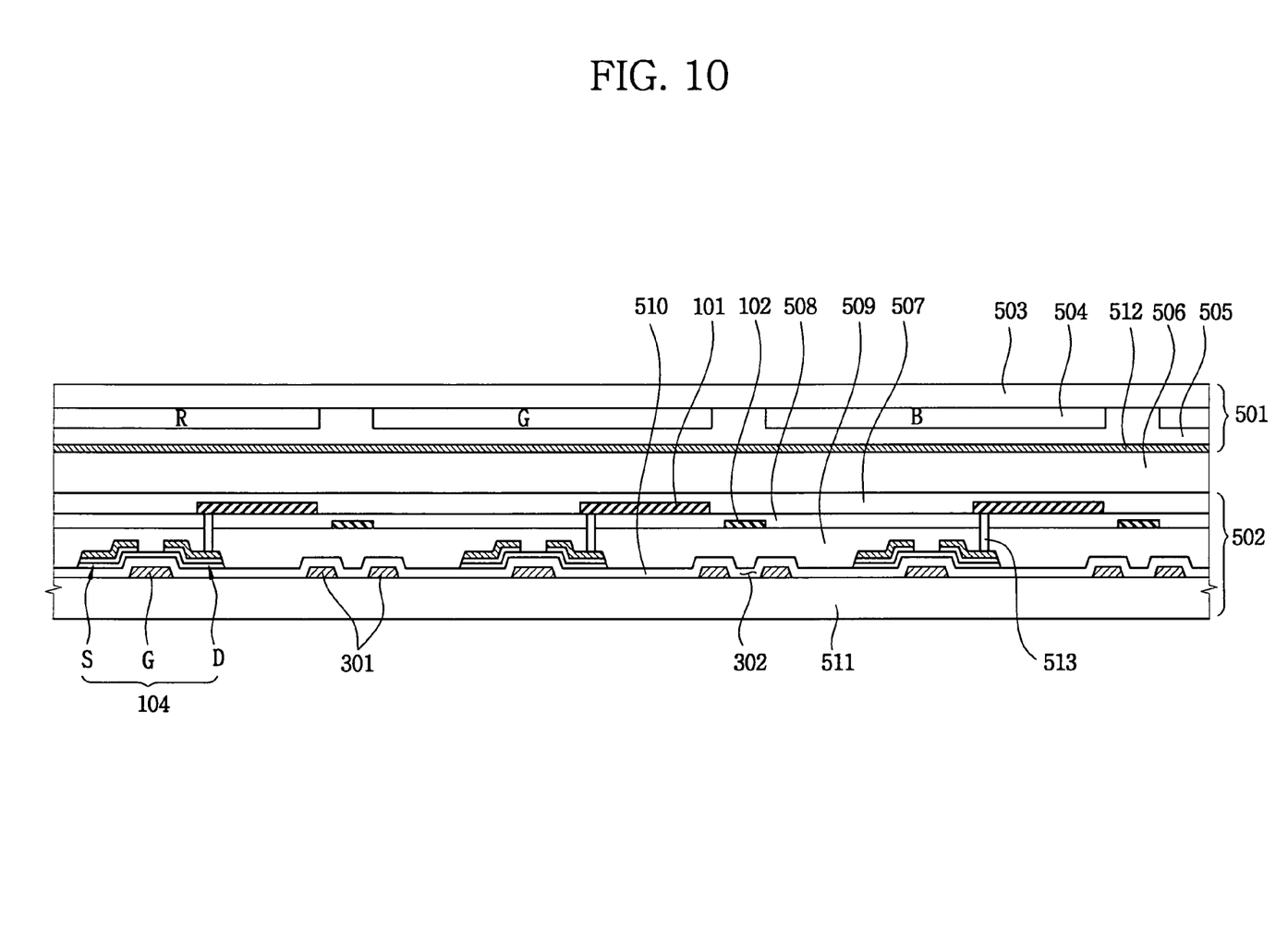
FIG. 10 is a cross-sectional view taken along a line A-A' in FIG. 9.
Figure 11:
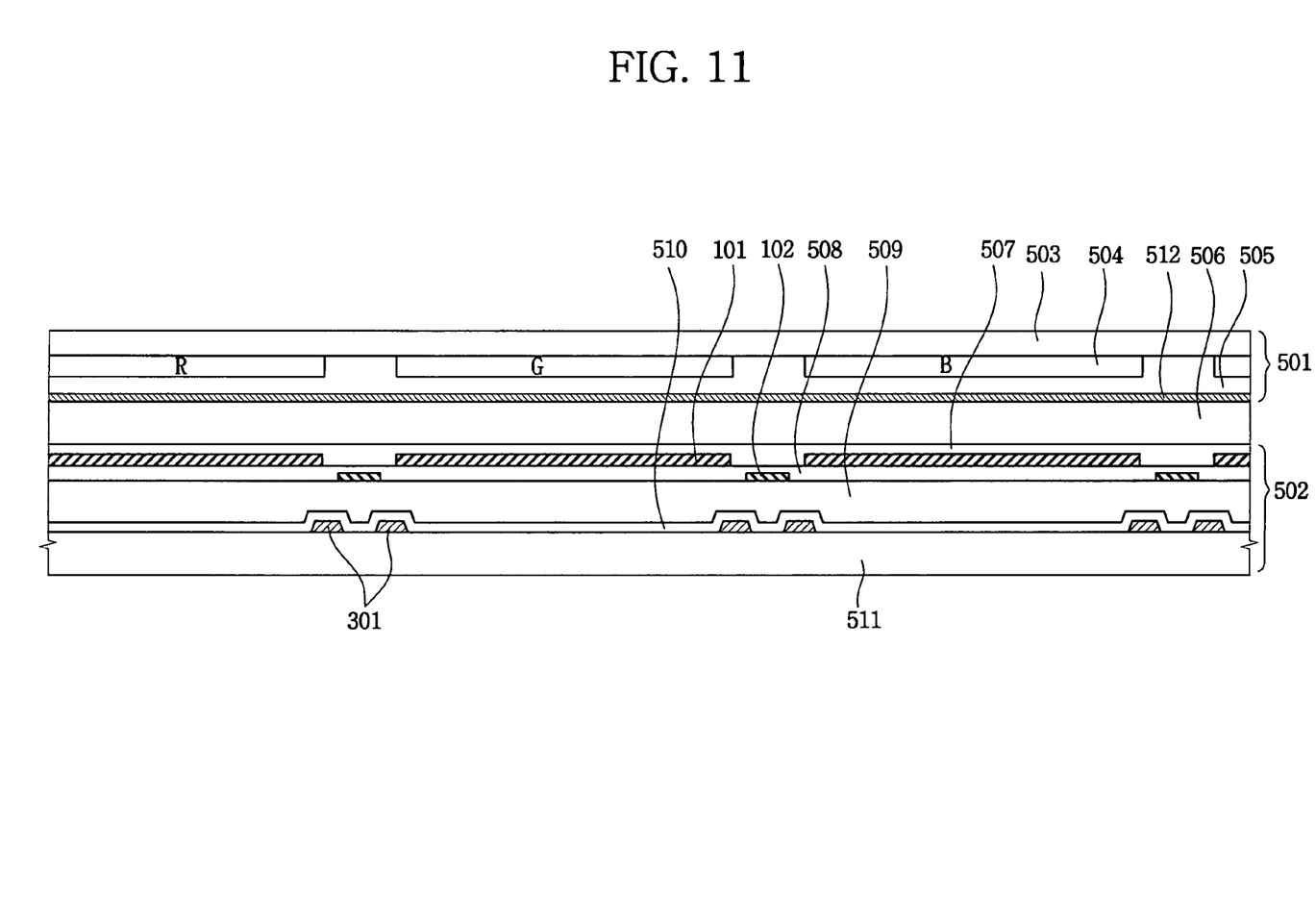
FIG. 11 is a cross-sectional view taken along a line B-B' in FIG. 9.

FIG. 10 is a cross-sectional view taken along a line A-A' in FIG. 9, and FIG. 11 is a cross-sectional view taken along a line B-B' in FIG. 9.

Referring to FIGS. 5 and 6, a liquid crystal display apparatus according to the present embodiment includes an array substrate 502, a color filter substrate 501 and a liquid crystal layer 506 interposed between the array substrate 502 and the color filter substrate 501.

The array substrate 502 includes a second transparent substrate 511.

A gate electrode G and a floating gate 301 are formed on the second transparent substrate 511. The gate electrode G and the floating gate 301 formed on a second transparent substrate 511 may include different material and be formed via a different manufacturing process. However, the floating gate 301 and the gate electrode G may include same material and be formed via a same manufacturing process. That is, a metal layer is formed on the second transparent substrate 511, and patterned to form the gate electrode G, the floating gate 301 and an opening 302. The opening 302 may be formed after the floating gate 301 is formed.

A gate insulation layer 510 is formed on the second transparent substrate 511 having the floating gate 301 and the gate electrode G. An amorphous silicon layer is formed on the gate insulation layer 510 and patterned to form an active layer. Source and drain electrodes S and D are formed on the active layer.

Then, a first insulation layer 509 is formed, and the data line 102 is formed on the first insulation layer 509.

As described above, the data line 102 is disposed over the floating gate 301 to cover the opening 302 of the floating gate 301. Therefore, a light that is generated from a backlight assembly (not shown) disposed under the array substrate 502 and passes through the opening 302, is blocked by the floating gate 301. Furthermore, an overlapping portion of the floating gate 301 and the data line 102 may be minimized to reduce a parasitic capacitance and power loss, and a cross-talk between the floating gate 301 and the data line 102 is reduced to enhance display quality.

A second insulation layer 508 is formed on the first insulation layer 509 having the data line 102 formed thereon, and a pixel electrode 101 is formed on the second insulation layer 508.

The pixel electrode 101 includes an electrically conductive and optically transparent material such as indium tin oxide (ITO), indium zinc oxide (IZO), etc. The ITO and IZO are also thermally stable, so that an electrode pattern may be easily formed with the ITO or IZO. The pixel electrode 101 is electrically connected to the drain electrode D of the thin film transistor 104.

Then, a third insulation layer 507 may be formed on the second insulation layer 508 having the pixel electrode 101.

The color filter substrate 501 includes a plurality of color filters. The color filters include a red color filter R, a green color filter G and a blue color filter B.

Each of the color filters faces the pixel electrode 101.

The color filter substrate 501 may be classified into a stripe type, a mosaic type, a triangle type and a four-pixel arrangement type. For example, the stripe type color filter substrate 501 is employed. Alternatively, the color filter substrate may employ other types.

A leveling layer 505 covers and protects the color filters. The leveling layer 505 also levels the color filters, and the leveling layer 505 includes an acryl resin or polyimide resin.

The common electrode 512 is formed on the leveling layer 505. The common electrode 512 includes indium tin oxide (ITO) or indium zinc oxide (IZO).

A reference voltage (or ground voltage) is applied to the common electrode 512 so that electric fields are generated between the common electrode 512 and the pixel electrode 101.

The liquid crystal layer 506 is interposed between the color filter substrate 501 and the array substrate 502. When the electric fields are applied to the liquid crystal layer 506, an arrangement of liquid crystal molecules of the liquid crystal layer 506 is changed to adjust optical transmittance.

That is, an amount of the light that passes through the liquid crystal layer 506 is adjusted according to the arrangement of the liquid crystal molecules.

When a gate driving voltage (not shown) applies a gate voltage to the gate electrode of the thin film transistor 104, the thin film transistor 104 is turned on, and when a data driving circuit (not shown) applies a data voltage to the source electrode of the thin film transistor 104, the data voltage is transferred to the pixel electrode 101 through the thin film transistor 104. Therefore, the arrangement of the liquid crystal molecules is changed to display images.

Hereinbefore, a conventional twisted nematic liquid crystal display apparatus has been explained for an example. However, the present invention may be applied to other type such as a vertical alignment mode liquid crystal display apparatus.

According to the present invention, the storage electrode or the floating gate prevents a light leakage. A distance between the openings and the storage electrode or the floating gate that blocks the light passing through the openings is short, so that a marginal width of the pixel electrode and the storage electrode or a marginal width of the pixel electrode and the floating gate may be reduced.

Furthermore, the storage electrode or the floating gate is formed on a same substrate as the pixel electrode. Therefore, a margin for misalignment between the color filter substrate and the array substrate is not required to enhance an aperture ratio.

Having described the exemplary embodiments of the present invention and its advantages, it is noted that various changes, substitutions and alterations can be made herein without departing from the spirit and scope of the invention as defined by appended claims.

What is claimed is:

1. An array substrate comprising:
    a transparent substrate;
    a light blocking pattern disposed on the transparent substrate;
    a plurality of pixel electrodes arranged in a matrix shape, the pixel electrodes being spaced apart from the light blocking pattern by a first distance and spaced apart from neighboring pixel electrodes by a third distance;
    a plurality of switching devices including gate, drain and source electrodes, the drain electrodes of the switching devices being electrically connected to the pixel electrodes, respectively;
    a data line spaced apart from the light blocking pattern by a second distance, the data line being disposed under a region between the pixel electrodes and non-coplanar with the pixel electrodes, the data line being electrically connected to the source electrode, and the data line having a first width that is smaller than the third distance between pixel electrodes neighboring each other; and
    a gate line being electrically connected to the gate electrode to turn on/off the switching devices,
    wherein the light blocking pattern overlaps at least a portion of the pixel electrodes neighboring each other and at least a portion of the data line, the light blocking pattern being disposed between the data line and the transparent substrate.

2. The array substrate of claim 1, wherein the second distance is smaller than the first distance.

3. The array substrate of claim 1, wherein the light blocking pattern is a storage electrode.

4. The array substrate of claim 1, wherein the gate line and the light blocking pattern are formed by patterning a same layer.

5. The array substrate of claim 1, wherein a portion of the light blocking pattern overlaps with two of the pixel electrodes neighboring each other by second and third widths that are different from each other, respectively.

6. The array substrate of claim 1, wherein the light blocking pattern comprises a window having a fourth width that is narrower than the first width of the data line, so that a light that passes through the window is blocked by the data line.

7. A liquid crystal display apparatus comprising:
a color filter substrate including color filters;
an array substrate including:
  a transparent substrate;
  a light blocking pattern disposed on the transparent substrate;
  a plurality of pixel electrodes arranged in a matrix shape, the pixel electrodes being spaced apart from the light blocking pattern by a first distance and spaced apart from neighboring pixel electrodes by a third distance;
  a plurality of switching devices including gate, drain and source electrodes, the drain electrodes of the switching devices being electrically connected to the pixel electrodes, respectively;
  a data line spaced apart from the light blocking pattern by a second distance, the data line being disposed under a region between the pixel electrodes and non-coplanar with the pixel electrodes, the data line being electrically connected to the source electrode, and the data line having a first width that is smaller than the third distance between pixel electrodes neighboring each other; and
  a gate line being electrically connected to the gate electrode to turn on or turn off the switching devices; and
a liquid crystal layer interposed between the color filter substrate and the array substrate,
wherein the light blocking pattern overlaps at least a portion of the pixel electrodes neighboring each other and at least a portion of the data line, the light blocking pattern being disposed between the data line and the transparent substrate.

8. The liquid crystal display apparatus of claim 7, wherein the second distance is smaller than the first distance.

9. The liquid crystal display apparatus of claim 7, wherein the light blocking pattern is a storage electrode.

10. The liquid crystal display apparatus of claim 7, wherein the gate line and the light blocking pattern are formed of a same layer through patterning.

11. The liquid crystal display apparatus of claim 7, wherein a portion of the light blocking pattern overlaps with two of the pixel electrodes neighboring each other by second and third widths that are different from each other, respectively.

12. The liquid crystal display apparatus of claim 7, wherein the light blocking pattern comprises a window having a fourth width that is narrower than the first width of the data line, so that a light that passes through the window is blocked by the data line.

* * * * *